Figure 1:
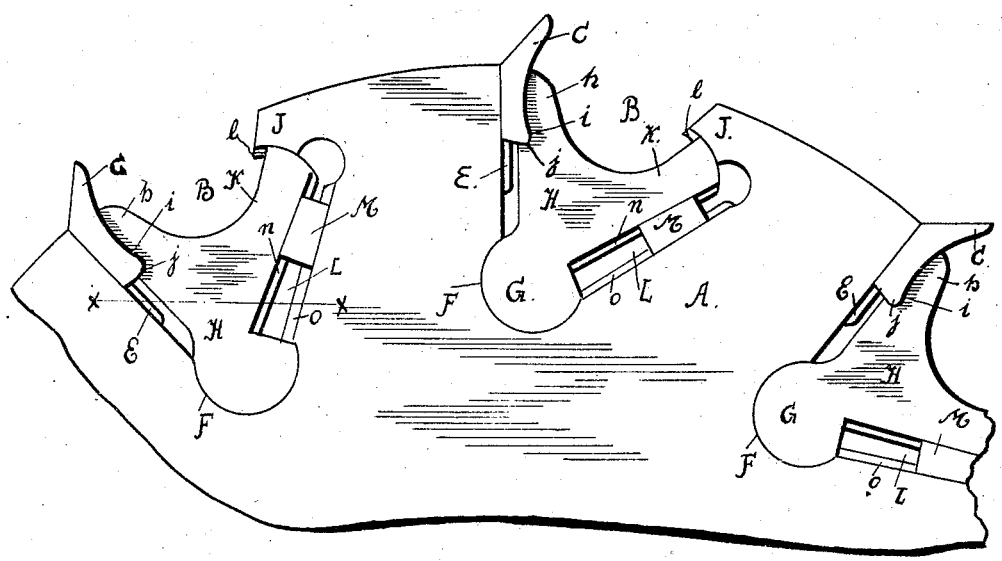

No. 785,583. PATENTED MAR. 21, 1905.
P. THOMPSON.
SAW.
APPLICATION FILED NOV. 14, 1904.

Witnesses:
K. H. Butken
C. Mortensen

Inventor
Patrick Thompson.
By H. C. Everett
Attorneys.

No. 785,583.                                    Patented March 21, 1905.

UNITED STATES PATENT OFFICE.

PATRICK THOMPSON, OF BEAVERFALLS, PENNSYLVANIA.

SAW.

SPECIFICATION forming part of Letters Patent No. 785,583, dated March 21, 1905.

Application filed November 14, 1904. Serial No. 232,639.

*To all whom it may concern:*

Be it known that I, PATRICK THOMPSON, a citizen of the United States of America, residing at Beaverfalls, in the county of Beaver and State of Pennsylvania, have invented certain new and useful Improvements in Saws, of which the following is a specification, reference being had therein to the accompanying drawings.

This invention has relation to certain new and useful improvements in saws, and relates more particularly to that type generally known as "circular saws."

The invention more specifically has relation to that type of circular saws employing detachable teeth; and the object of the present invention is the provision of novel means for locking the teeth securely in the blade of the saw and for permitting the ready and easy removal of the teeth for sharpening the same when desired.

Another object of the invention is to so construct the locking means for the teeth that the centrifugal motion imparted to the saw in operation will tend to more firmly secure the teeth in the blade of the saw and prevent the same from becoming loose.

The invention resides particularly in the construction of the wedge or holding member that secures the teeth of the saw in position in the blade and in the provision of a wedge member that tends to tighten under the centrifugal motion of the saw.

In describing the invention in detail reference will be had to the accompanying drawings, wherein like reference characters designate corresponding parts throughout the several views, in which—

Figure 2:
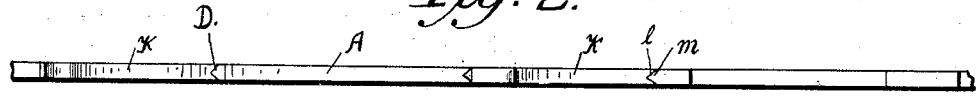
Figure 3:
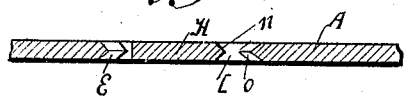
Figure 4:
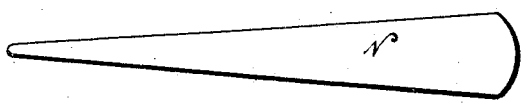
Figure 5:
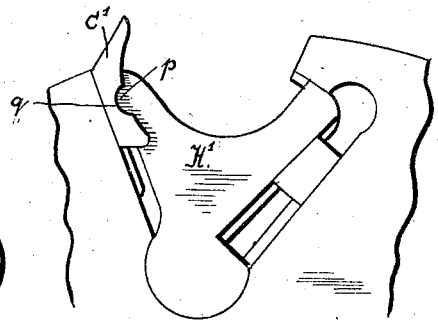

Figure 1 is a fragmentary side elevation of the saw, showing a plurality of teeth secured in the saw-blade in accordance with my invention. Fig. 2 is a top plan or edge view of the same. Fig. 3 is a sectional view taken on the line $x\ x$ of Fig. 1. Fig. 4 is a detail plan view of an instrument or tool convenient for use in securing the wedge or holding member in position; and Fig. 5 is a fragmentary view of a saw, showing a slightly-modified form of construction.

The saw-blade A is provided in the periphery with the cut-away portions B to receive the wedge or holding member and also the teeth C. The teeth C may be of any desired construction as to their points or cutting edges, the only necessary requisite being that the shank thereof is preferably provided with a groove D of V shape in cross-section and which receives a rib E, formed on one of the walls of the cut-away portion of the saw-blade and also made preferably V shape in cross-section, so as to fit with the groove in the back of the shank of the tooth. It will of course be evident that other form of groove and other form of rib may be employed than that herein shown and described, the essential feature being a construction which will prevent a lateral movement of the saw-blade.

The cut-away portions B in the saw-blade are somewhat of a V shape in their contour, and at the inner end thereof the wall F is made concave or substantially segment-shaped, and this segment-shaped recess thus formed receives the segment G, formed on the inner end of the wedge or holding member H. This wedge or holding member H is somewhat triangular in form, the arm $h$ thereof being cut away at $i$ to receive the shank of the tooth C, the lower end of the shank resting upon the shoulder $j$. The other arm, $k$, of the wedge or holding member H has its end rounded and provided with a groove $l$, V-shaped in cross-section to receive the V-shaped edge $m$ on the arm or projection J of the saw-blade. It will of course be evident that a different form of tongue and groove $l\ m$, respectively, may be employed or that the groove may be in the part J and the tongue on the end of the arm $k$, the essential feature in construction being simply to prevent the lateral movement of the arm $k$.

The arm $k$ is cut away on its lower side and is provided with a tongue $n$, while the lower wall of the recess L is provided with a tongue $o$, these tongues $n$ and $o$ being preferably V-shaped in cross-section. The wedge M is grooved on its two edges to receive the tongues $n$ and $o$.

In Fig. 5 a slight modification is shown, in which the wedge or holding member H' is provided with a bead or projection $p$ to engage in the notch $q$, provided therefor in the saw-tooth C'. The remainder of the construction in this modification is the same as that heretofore described.

In placing the saw-teeth in position in the saw-blade or in removing the teeth from the blade it is preferable to use an instrument or tool N, such as shown in Fig. 4 of the drawings. The fulcrum end G of the wedge or holding member H is placed in its seat F and the arm $k$ lowered until its free end engages the lower wall of the recess L, so that the tongue $m$ may be entered into the groove $l$ and the arm $k$ then lifted, so as to move the arm $h$ toward the rib or tongue E. The wedge or holding member is moved in this direction sufficiently far to make the opening L of a size to permit the insertion of the wedge M. The arm $k$ is then forced downward onto the wedge M, this wedge being moved back toward the widest part of the slot or opening L. The tooth C is then inserted in its position and the wedge M is moved along, so as to force the arm $k$ tightly against the tooth C, and the latter is firmly wedged in its position It is to be noted that the wedge M tightens as it is moved toward the periphery of the saw, and consequently the centrifugal motion of the saw will at all times tend to force the wedge M more firmly into wedging engagement to keep the arm $h$ always pressed tightly against the tooth C.

To remove the tooth, it is simply necessary to force the wedge M backward toward the larger end of the slot or opening L, which will allow the arm $k$ to be pressed downwardly and loosen the arm H from the tooth C.

It will be noted that various changes may be made in the details of construction without departing from the general spirit and scope of the invention.

Having fully described my invention, what I claim, and desire to secure by Letters Patent, is—

The combination with a saw-blade having a cut-away portion at its edge of substantial V shape terminating at the apex of its edges in a segment-shaped recess, one edge of said cut-away portion terminating within the periphery of the saw and leaving an arm or projection with a concave edge, of a holding member of substantially triangular form having a segment-shaped portion at its inner end fitting the said segment-shaped recess, the angle of the edges of said holding member being less acute than the angle of the edges of said cut-away portion, a tooth interposed between one edge of said cut-away portion and said holding member and a wedge fitting between the other edge of said holding member and the edge of said cut-away portion, said wedge serving when moved outwardly, to bind the tooth between the holding member and one edge of the cut-away portion of the saw.

In testimony whereof I affix my signature in the presence of two witnesses.

PATRICK THOMPSON.

Witnesses:
ALBERT WATSON,
S. W. ROUZER.